May 15, 1956   H. DORPMUND   2,745,529
SYNCHRONIZING GEARS

Filed Sept. 23, 1954   2 Sheets-Sheet 1

INVENTOR.
HEINZ DÖRPMUND
BY
Hans G. Joseph
AGENT

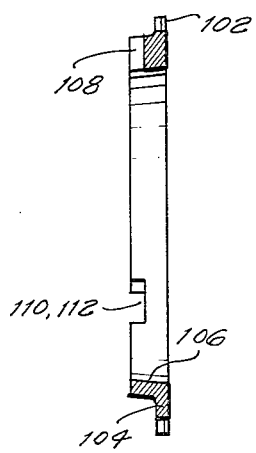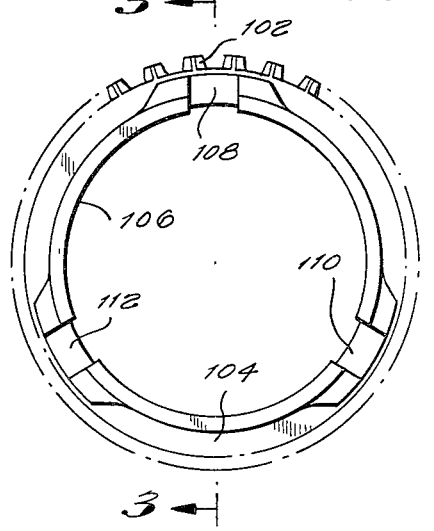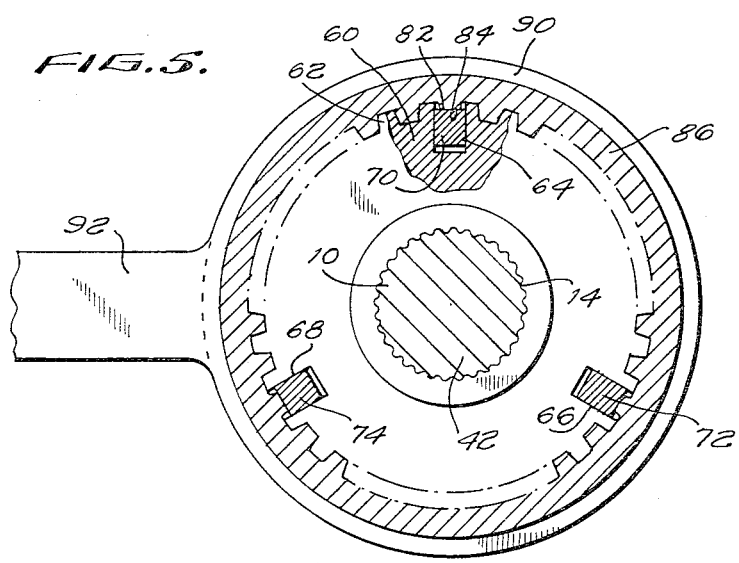

United States Patent Office 2,745,529
Patented May 15, 1956

2,745,529

SYNCHRONIZING GEARS

Heinz Dorpmund, Wolfsburg, Germany, assignor to Volkswagenwerk G. m. b. H., Wolfsburg, Germany Application September 23, 1954, Serial No. 457,959

Claims priority, application Germany September 26, 1953

6 Claims. (Cl. 192—53)

The present invention relates to synchronizing gears, and more particularly to synchronizing gears for a motor vehicle.

It is an object of the present invention to reduce as far as possible the overall length of such a synchronizing gear.

It is another object of the present invention to reduce the weight of synchronizing gears of the kind described hereinabove.

It is a further object of the present invention to shorten considerably the elements taking part in the switching operation of synchronizing gears of the type described hereinabove.

It is still another object of the present invention to reduce the length of the gear shift sleeve forming part of the synchronizing gear according to the present invention.

Other objects and advantages of the present invention will become apparent from the following detailed description thereof when read in connection with the accompanying drawings showing, by way of example, an embodiment of the present invention. In the drawings:

Figs. 3 and 4 are, respectively, a cross-section and an elevation of a part of Fig. 1;

Fig. 5 is a cross-section along the plane A—A of Fig. 1; and

Figure 1:
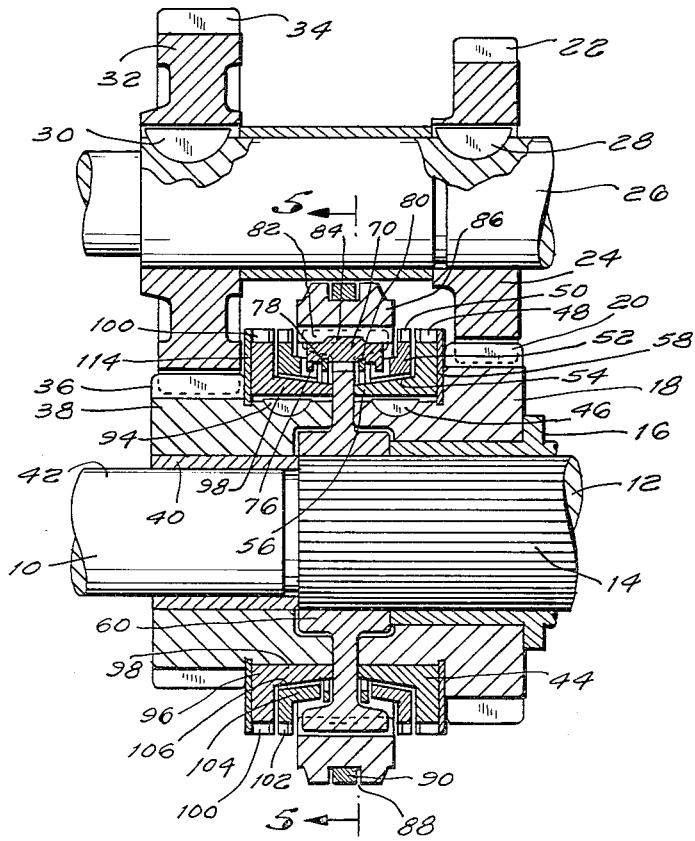
Fig. 1 is a sectional elevation of a synchronizing gear according to the present invention in neutral position.

Referring now to the drawings, a first shaft 10 is driven by the engine (not shown) and has a part 12 provided with longitudinal grooves 14. The part 12 of the shaft 10 carries a sleeve 16 on which a body 18 having a toothed rim 20 is rotatably arranged. The toothed rim 20 of the rotatable body 18 engages a toothing 22 provided on the outer circumference of a gear wheel 24 being the third wheel of the change speed gear and being coupled by means of a coupling member 28 to a second shaft 26 arranged parallel to the first shaft 10.

The second shaft 26 carries by means of a coupling member 30 a gear wheel 32 being the fourth wheel of the change speed gear. The fourth gear wheel 32 is arranged substantially parallel to the third gear wheel 24 and has a toothing 34 engaging a toothed rim 36 formed in one piece with a toothed body 38 (termed hereinafter the "first body") arranged loosely by means of a sleeve 40 on the non-fluted portion 42 of the first shaft 10.

A ring-shaped body 44 is rigidly connected by coupling members 46 with the body 18 so as to rotate therewith. The ring-shaped body 44 is provided with circumferential teeth 48 adapted for alignment with the circumferential teeth 50 of an annular member 52 having a conically shaped inner portion 54 adapted to engage the conically shaped outer portion 56 of the ring-shaped body 44. An annular disc 58 is arranged between the ring-shaped body 44 and the toothing 20 of the rotatable body 18 for a purpose to be explained more fully hereinafter in connection with the fourth gear wheel 32.

A ring-shaped member 60 provided with circumferential teeth 62 is rigidly connected to the grooves 14 of the part 12 of the first shaft 10 so as to rotate with the latter. The member 60 is provided with three equidistant circumferential recesses 64, 66, and 68 (Fig. 5) which are spaced from one another by angles of substantially 120°. The circumferential recesses 64, 66, and 68 are engaged, respectively by locking members 70, 72, 74 provided as shown more fully in Fig. 1, with end portions such as 76 forming pockets for receiving spring rings 78 and 80 urging the locking members 70, 72, 74 outward so that the toothed parts such as 84 thereof engage the inner teeth 82 of a gear shift sleeve 86. The outer perimeter of the gear shift sleeve 86 is provided with a groove 88 for the accommodation of the annular end 90 of a gear shift lever 92.

With the first body 38 is rigidly connected by means of a coupling member 94 a second body 96 so as to rotate with the first body 38. The second body 96 has a conically shaped part 98 and is provided with a first circumferential toothing 100 adapted to engage a second toothing 102 arranged on a ring-shaped member 104 having a conically shaped surface 106 abutting against the conically shaped part 98 of the second body 96 (Figs. 3 and 4). Thus it will be understood that the ring-shaped member 104 acting as a synchronizing ring may be imparted a limited movement relative to the second body 96 in a direction substantially parallel to the first shaft 10 whereby the second toothing 102 of the synchronizing ring or member 104 is aligned with the first toothing 100 of the second body 96.

The member or synchronizing ring 104 is provided with three circumferential recesses 108, 110, 112 corresponding, respectively, to the circumferential recesses 64, 66, 68 of the member 60 and forming continuations thereof. The circumferential recesses 64—68 and 108—112 are thus adapted for being engaged by the inner teeth 82 of the gear shift sleeve 86 in the operative position shown in Fig. 2.

Between the second body 96 and the toothed rim 36 of the first body 38 a stop means designed as an annular disc 114 (Fig. 6) is arranged. The annular disc 114 is firmly held between the second body 96 and the toothed rim 36 of the first body 38 and has an outer perimeter projecting beyond the first toothing 100 arranged on the second body 96 so as to limit the motion of the gear shift sleeve 86 toward the left parallel to the first shaft 10.

It should be understood that the toothings, such as 48 and 100, of the body 44 and the part 98, respectively, may be pressed or shrunk on the body or part 44 and 98, respectively.

Figures 2, 6:
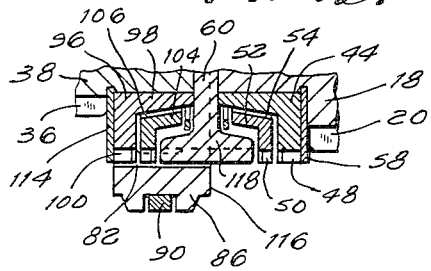
Fig. 2 is a sectional elevation of parts of Fig. 1 in an operative position.
Fig. 6 is an elevation of a part of Fig. 1.

The operation of this device is as follows:

When it is intended to shift the gear shift sleeve 86 from the neutral position thereof shown in Fig. 1 into the operative position thereof shown in Fig. 2 by actuating the gear shift lever 92 the annular end 90 of which engages the groove 88 provided at the outer perimeter of the gear shift sleeve 86, the inner teeth 82 of the latter will enter the circumferential recesses 64—68 of the ring-shaped member 60 which receive the locking members 70—74 and the spring rings 78 and 80. However, a shifting of the gear shift sleeve 86 into the operative position thereof shown in Fig. 2 can only be effected after the synchronizing ring 104 which abuts with the conical inner surface 106 thereof against the conically shaped part 98 of the second body 96 rotates at the same speed as the second body 96 so that the aligned first and second toothings 100, 102 of the second body 96 and the synchronizing ring 104 allow the inner toothing 82 of the gear shift sleeve 86 to pass so that the same reaches the operative position shown in Fig. 2.

However, a shifting of the gear shift sleeve beyond the extreme position thereof shown in Fig. 2 is prevented by the annular disc 114 held firmly between the second body 96 and the toothed rim 36 of the first body 38. The outer perimeter of the annular disc 114 projects a little beyond the first toothing 100 arranged on the second body. In consequence thereof, the motion of the gear shift sleeve 86 toward the left parallel to the first shaft is limited, the annular disc 114 acting as a stop means for the motion of the gear shift sleeve 86.

It should be understood that the present invention which has been described hereinabove in connection with the annular disc 114 associated with the fourth gear wheel 32 of a change speed gear could be equally adapted for use with the third gear wheel 24 of the change speed gear, an annular disc 58 being provided between the ring-shaped body 44 and the toothing 20 of the rotatable body 18. The annular disc 58 has preferably an outer perimeter projecting a little beyond the toothing 48 of the ring-shaped body 44.

It should be noted that according to the invention the space between a toothed part and the counterpart thereof is reduced or even obliterated. In consequence thereof, the axial length of the gear shift sleeve 86 is reduced to the minimum required for the transmitting action thereof.

Furthermore, the gear shift sleeve 86 in the operative position thereof shown in Fig. 2 is only in engagement with part of the circumferential teeth 62 of the ring-shaped member 60, the right hand half of the teeth 62 being freed by the gear shift sleeve 86. Under the influence of the centrifugal force exerted on the ring-shaped member 60 and the circumferential teeth 62 thereof, the latter and the gear shift sleeve 86 have a tendency to assume an inclined position with reference to the normal position thereof which may cause a "dancing" movement or a "pendulum" movement of the gear shift sleeve 86 which thus has the tendency to come into deeper engagement with the circumferential toothings 100 and 102 which in turn leads to quick wear of the annular end 90 of the gear shift lever 92. By providing the annular disc 114 the tendency of the gear shift sleeve 86 to move in axial direction is taken up, thus relieving the load on the annular end 90 of the gear shift lever.

It should be noted that in the end position shown in Fig. 2 the right edge 116 of the gear shift sleeve 86 shortened to the least possible amount coincides approximately with the median 118 of the member 60 so that an inclined position of the gear shift sleeve 86 under the action of a centrifugal force causes a force directed to the left which is taken up by the annular disc 114. At the same time the annular disc 114 prevents a "dancing" or a "pendulum" movement of the gear shift sleeve 86.

It should be understood that many changes may be made in the form, construction, and arrangement of the several parts of the synchronizing gear described hereinabove without sacrificing any of the advantages thereof, the novel and advantageous limitations of my synchronizing gear being claimed in the claims appended to this specification.

I claim:

1. A synchronizing gear, particularly for motor vehicles, comprising, in combination, a shaft, a first body arranged loosely on said shaft, said first body having a toothed rim, a second body arranged on said first body near said toothed rim thereof, gear shifting means arranged for linear motion substantially parallel to said shaft, said gear shifting means being in toothed engagement with said second body, and an annular disc arranged at the end of said toothed rim of said first body adjacent to said second body, said annular disc forming a stop limiting the motion of said gear shifting means parallel to said shaft.

2. A synchronizing gear as claimed in claim 1, said second body being keyed to said first body, and a toothing pressed on said second body.

3. A synchronizing gear as claimed in claim 1, said second body being keyed to said first body, and a toothing being shrunk on said second body.

4. A synchronizing gear, particularly for motor vehicles, comprising, in combination, a shaft, a first body arranged loosely on said shaft, said first body having a toothed rim, a second body arranged on said first body in fixed axial relationship thereto near said toothed rim thereof, said second body having a conically shaped part, a disc-shaped part arranged for rotation with said shaft and extending near said conically shaped part of said second body, a first toothing arranged on said second body, a ring-shaped member having a conically shaped surface abutting against said conically shaped part of said second body so that said ring-shaped member may be imparted a limited movement relative to said second body in a direction substantially parallel to said shaft, a second toothing arranged on said ring-shaped member and being arranged for alignment with said first toothing arranged on said second body, said disc-shaped part and said ring-shaped member being provided with equidistant circumferential recesses, locking means arranged, respectively, in said circumferential recesses of said disc-shaped part and said ring-shaped member, gear shifting means arranged for linear motion substantially parallel to said shaft, said gear shifting means having an inner toothing being in engagement with said first toothing arranged on said second body, and stop means limiting the motion of said gear shifting means parallel to said shaft, said stop means being arranged between said toothed rim of said first body and said second body.

5. A synchronizing gear, particularly for motor vehicles, comprising, in combination, a shaft, a first body arranged loosely on said shaft, said first body having a toothed rim, a second body arranged on said first body in fixed axial relationship thereto near said toothed rim thereof, said second body having a conically shaped part, a disc-shaped part arranged for rotation with said shaft and extending near said conically shaped part of said second body, a first toothing arranged on said second body, a ring-shaped member having a conically shaped surface abutting against said conically shaped part of said second body so that said ring-shaped member may be imparted a limited movement relative to said second body in a direction substantially parallel to said shaft, a second toothing arranged on said ring-shaped member and being arranged for alignment with said first toothing arranged on said second body, said disc-shaped part and said ring-shaped member being provided with equidistant circumferentially recesses, locking means arranged, respectively, in said circumferential recesses of said disc-shaped part and said ring-shaped member, gear shifting means arranged for linear motion substantially parallel to said shaft, said gear shifting means having an inner toothing being in engagement with said first toothing arranged on said second body, and an annular disc arranged at the end of said toothed rim of said first body adjacent to said second body, said annular disc forming a stop limiting the motion of said gear shifting means parallel to said shaft.

6. A synchronizing gear as claimed in claim 5, said annular disc having an outer perimeter projecting beyond said first toothing arranged on said second body so as to limit the motion of said gear shifting means parallel to said shaft.

References Cited in the file of this patent

FOREIGN PATENTS 529,517  Great Britain _____ Nov. 22, 1940